United States Patent
Krishna et al.

(10) Patent No.: US 8,189,633 B2
(45) Date of Patent: May 29, 2012

(54) POLYCRYSTALLINE TRANSPARENT CERAMIC ARTICLES AND METHOD OF MAKING SAME

(75) Inventors: Kalaga Murali Krishna, Bangalore (IN); Venkat Subramaniam Venkataramani, Clifton Park, NY (US); Mohan Manoharan, Bangalore (IN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/690,974

(22) Filed: Jan. 21, 2010

(65) Prior Publication Data
US 2010/0117036 A1    May 13, 2010

Related U.S. Application Data

(62) Division of application No. 11/302,555, filed on Dec. 13, 2005, now Pat. No. 7,711,022.

(51) Int. Cl.
*H01S 3/17* (2006.01)

(52) U.S. Cl. ....... 372/40; 372/41; 372/44.011; 252/583; 252/584

(58) Field of Classification Search ............. 372/40, 372/41; 252/583–584
See application file for complete search history.

(56) References Cited

U.S. PATENT DOCUMENTS 7,449,128 B2 * 11/2008 Krishna et al. ......... 252/301.4 R

FOREIGN PATENT DOCUMENTS

| CN | 1560890 A | 1/2005 |
|----|-----------|--------|
| JP | 623005 A  | 9/1987 |

OTHER PUBLICATIONS

State Intellectual Property Office, P.R. China, English Translation of First Office Action issued on Nov. 29, 2010, 9 pages.

* cited by examiner

*Primary Examiner* — Dung Nguyen
(74) *Attorney, Agent, or Firm* — Paul J. DiConza

(57) ABSTRACT

A polycrystalline transparent ceramic article including lutetium is presented. The article includes an oxide with a formula of $ABO_3$, having type A lattice sites and type B lattice sites. The lattice site A may further comprise a plurality of elements, in addition to lutetium. Type B lattice site includes aluminum. An imaging device, a laser assembly, and a scintillator including the lutetium-based article is provided. A method of making the above article is also provided.

3 Claims, 1 Drawing Sheet

POLYCRYSTALLINE TRANSPARENT CERAMIC ARTICLES AND METHOD OF MAKING SAME

This application is a divisional of application Ser. No. 11/302,555, filed 13 Dec. 2005, which is hereby incorporated by reference herein in its entirety.

BACKGROUND

The invention relates generally to polycrystalline transparent ceramic articles and in particular to lutetium-based compositions for optical applications.

Ceramic materials, such as lutetium-based optical compositions, have many applications in scintillator, laser, and imaging technology. Optical applications often require a transparent processed form of the material to reduce light losses due to scattering and absorption. To that end, the processed form is generally desired to have a single phase microstructure. Moreover, in many applications the material is desired to emit light or other electromagnetic radiation within a particular wavelength range. Optical properties such as the wavelength range of the emission and the efficiency of light conversion can be regulated, or "tuned," in optical materials by selective usage of one or more dopants and by adjusting the concentration of the dopants within the material.

Current applications often use monocrystalline optical materials, the making of which is quite expensive and time consuming. Moreover, optical tunability in single crystals is often hard to achieve due to the difficulty in doping during crystal formation.

An alternate method is to employ polycrystalline materials. The polycrystalline materials are more easily doped as compared to monocrystalline materials. The performance and utility of the polycrystalline materials depend in part on the size, shape, and morphology of the crystallites constituting the material which in turn may be controlled via processing.

The processing of polycrystalline ceramic materials to obtain a transparent form may require exposure to high temperature, during which a desirable microstructure may degrade due to such thermally activated processes as grain growth, phase transformation, and other related mechanisms. Therefore, there is a need to address these issues to provide an efficient, economical, and robust polycrystalline optical composition.

BRIEF DESCRIPTION

Embodiments of the present invention address this and other needs. In accordance with an embodiment, an article comprises an oxide having a polycrystalline structure comprising type A lattice sites and type B lattice sites. The oxide has a formula of $ABO_3$, wherein A represents material occupying the type A lattice sites and B represents material occupying the type B lattice sites. Here, A comprises a plurality of elements comprising lutetium and the lutetium is present in an amount of at least about 0.5 mole fraction of the oxide, and B comprises aluminum. Other embodiments presented herein include a laser assembly having an emission medium comprising the article, and an imaging device comprising a scintillator comprising the article.

DRAWINGS

These and other features, aspects, and advantages of the present invention will become better understood when the following detailed description is read with reference to the accompanying drawings, wherein.

DETAILED DESCRIPTION

Figure 1:
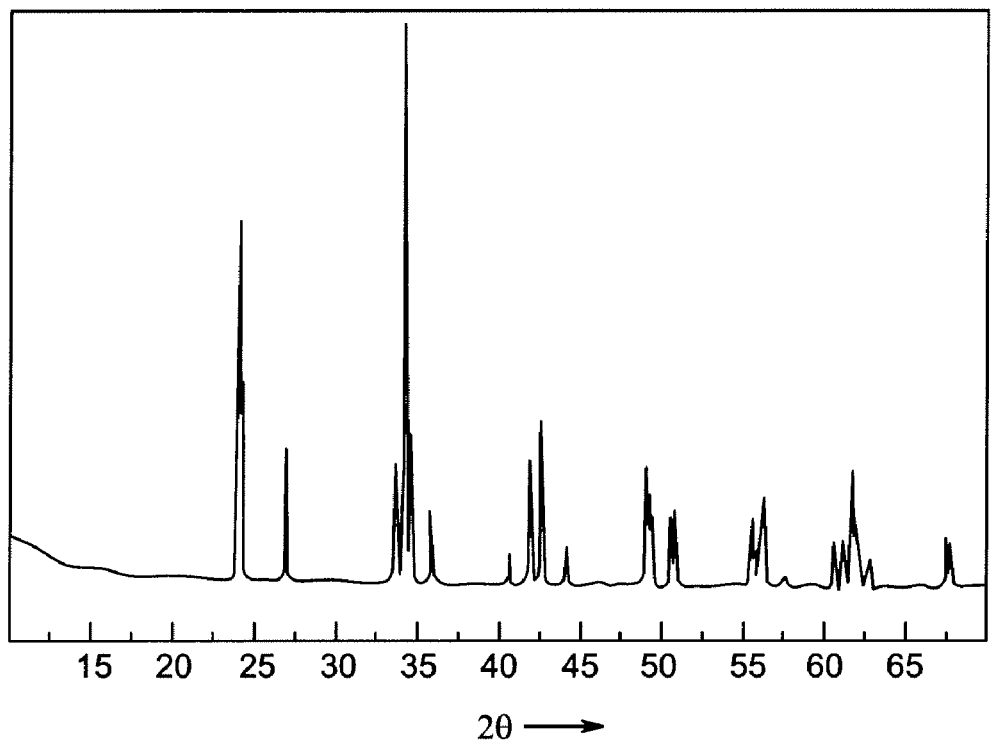
FIG. 1 is an XRD pattern of $Lu_{0.8}Gd_{0.15}Y_{0.05}AlO_3$.

As used herein, the articles "a," "an," and "the" should be understood to indicate "at least one."

As used herein, the term "about" should be understood to indicate plus or minus 0.001 percent (+/−0.001%). The term "radiation" as used herein refers to the whole spectrum of electromagnetic radiation. The term "light" as used herein refers to the visible region of the electromagnetic spectrum.

In accordance with one embodiment, an article including an oxide having a polycrystalline structure with type A lattice sites and type B lattice sites is provided. The oxide has a formula of $ABO_3$ where A represents material occupying the type A lattice sites, and B represents material occupying the type B lattice sites. In one embodiment, A includes a plurality of elements in addition to lutetium (Lu) and B includes aluminum (Al). The lutetium is present in an amount of at least about 0.5 mole fraction of the oxide.

As will be used henceforth the term "article" should be understood to indicate the article as described above, unless otherwise specified. Henceforth the term "oxide" should be understood to indicate the oxide as described above, unless otherwise specified.

A high concentration of lutetium in the oxide tends to impart a desirable degree of density to the article. In many optical applications, high density contributes to the radiation stopping power of the material, which enhances the performance of products such as scintillators. In certain embodiments, the concentration of Lu is in a range from about 0.5 mole fraction to about 0.995 mole fraction. In particular embodiments, the Lu is present in an amount in a range from about 0.8 to about 0.995 mole fractions.

In one embodiment, the article having the oxide includes a rare earth element (RE), at the type A lattice sites in addition to lutetium. In particular embodiments, the rare earth element comprises one or more of gadolinium (Gd), terbium (Tb), and ytterbium (Yb). As will be discussed below, the addition of RE may help to stabilize desirable crystal structure. In one embodiment, the concentration of RE is greater than about 0.005 mole fraction. In certain embodiments, RE is present in a range from about 0.005 mole fraction to about 0.5 mole fraction.

In certain embodiments, the article having the oxide further includes a transition metal, for example, yttrium (Y), at the type A lattice site. The addition of yttrium may help to obtain desirable crystal structure. Further, the presence of yttrium may lower temperature required for further processing of the article. In one embodiment, the concentration of yttrium is greater than about 0.005 mole fraction. In certain embodiments, the concentration of yttrium is in a range from about 0.005 mole fraction to about 0.5 mole fraction.

In a specific example, the article with the oxide has yttrium at the type A lattice site with a concentration in a range from about 0.0025 mole fraction to about 0.5 mole fraction, and another rare earth element at the type A lattice site with a concentration in a range from about 0.0025 mole fraction to about 0.5 mole fraction, in addition to lutetium already present in the lattice. In particular embodiments, concentration of yttrium is in a range from about 0.0025 mole fraction to about 0.1 mole fraction. The concentration of lutetium in the oxide may be in a range from about 0.5 to about 0.995 mole fraction. As described above, suitable rare earth elements that may be incorporated in $ABO_3$ include Gd, Tb, Yb and combinations of these. Example compositions are $Lu_{0.5} Y_{0.25} Gd_{0.25} AlO_3$ and $Lu_{0.995} Y_{0.0025} Gd_{0.0025} AlO_3$. Another exemplary composition of the article includes $Lu_{0.8} Y_{0.05} Gd_{0.15} AlO_3$.

The polycrystalline oxide with the formula $ABO_3$, in one embodiment, has a perovskite structure. Materials having a perovskite structure are desirable for certain optical applications. For example, in a scintillator detector the use of a host material having a perovskite structure may improve the decay time of a dopant dispersed in the host material, as compared to, for example, a host material having a garnet structure. Moreover, a material having a perovskite structure improves the stopping power of a scintillator.

The perovskite structures are usually formed by compounds having the general formula $ABX_3$, with type A lattice sites and type B lattice sites. As used herein, "A sites" or "A lattice sites" refers to sites within the perovskite crystal lattice having an anion coordination of greater than 9 (such as, for example, those sites having a coordination number of 12), and "B sites" or "B lattice sites" refers to sites within the perovskite crystal lattice with an anion coordination of 6.

The formation and stability of perovskite structure is in large part determined by the ionic sizes of the constituent ions. The lutetium cation, as a result of the well-known phenomenon of Lanthanide contraction, has a size that does not lend itself easily to form a perovskite structure. The presence of other elements at the type A lattice site imparts stability to the perovskite structure.

The factor that defines the stability of the perovskite structure is the so-called tolerance factor, which is given by the equation $$T = \frac{(R_A + R_X)}{\sqrt{R_B + R_X}}.$$

Here, $R_A$, $R_B$, and $R_x$ denote mean radii of ions of the elements at the A lattice site, B lattice site and at the X lattice site, respectively. Here, X represents oxygen of $ABO_3$.

Typically, the perovskite structure is stable at a tolerance factor of above approximately 0.94. The table below gives the tolerance factor at different mole fractions of exemplary compositions, where a rare earth element Gd or a transition element Y is substituted at type A lattice sites along with Lu in the crystal structure in an effort to stabilize the perovskite structure.

| Mol. Fracn Lu | Mol. Fracn Gd | mean Radius | Tolerance factor |
|---|---|---|---|
| 1 | 0 | 1.15 | 0.934 |
| 0.9 | 0.1 | 1.159 | 0.938 |
| 0.7 | 0.3 | 1.177 | 0.944 |
| 0.5 | 0.5 | 1.195 | 0.951 |
| 0.3 | 0.7 | 1.213 | 0.957 |
| 0.1 | 0.9 | 1.231 | 0.964 |
| 0 | 1 | 1.24 | 0.967 |

| Mol. Fracn Lu | Mol. Fracn Y | mean Radius | Tolerance factor |
|---|---|---|---|
| 1 | 0 | 1.15 | 0.934 |
| 0.9 | 0.1 | 1.163 | 0.939 |
| 0.7 | 0.3 | 1.189 | 0.949 |
| 0.5 | 0.5 | 1.215 | 0.958 |
| 0.3 | 0.7 | 1.241 | 0.968 |
| 0.1 | 0.9 | 1.267 | 0.977 |
| 0 | 1 | 1.28 | 0.982 |

From the table above, an analysis based on the tolerance factor suggests that pure $LuAlO_3$ may not be stable in the perovskite structure, while $YAlO_3$ and $GdAlO_3$ are stable. The analysis further suggests that additions of Y and/or Gd to $LuAlO_3$ advantageously may serve to stabilize this material in a perovskite structure.

The article including the polycrystalline oxide having the perovskite structure phase is stable above the room temperature (about 25° C.) and below the melting temperature of the oxide, which is about 2400° C. The perovskite structure of the oxide $ABO_3$ is preserved even at high pressure. The preservation of the perovskite structure phase even at moderately high temperature and pressure is a favorable property because it reduces the risk of adverse structural changes in the article during processing. In certain embodiments, the oxide is stable at a pressure that is in a range of about one atmospheric pressure to about 500 MegaPascal. In particular embodiments, the oxide is stable in a range of about one atmospheric pressure to about 500 GigaPascal.

The article having the oxide may include alkaline earth elements (AE) at type A lattice sites. The inclusion of alkaline earth elements at A lattice sites imparts stability to the perovskite structure due to larger cationic size of the alkaline earth elements. The addition of AE in the lattice may lower the temperature required for processing. The AE includes, in particular embodiments, at least one alkaline earth element selected from calcium, strontium, barium or magnesium.

The inclusion of ions at type A lattice sites having different valences than lutetium would result in a charge imbalance if left unchecked; this condition may be countered by substituting ions at the type B lattice sites. For example, a divalent calcium ion substituting for a trivalent lutetium at the type A lattice site may require a tetravalent ion, such as hafnium, at the type B lattice site to counter the charge on the oxygen anion. Typical exemplary compositions including the ions may be represented as $(Lu, RE, Y)_{1-m} (AE)_m C_m Al_{1-m} O_3$, where C is a tetravalent ion. Here, Lu, RE and Y stand for one or more of lutetium (Lu), rare earth element (RE) or yttrium (Y) at the type A lattice site. The alkaline earth element (AE) is substituted at the type A lattice site, and C, the tetravalent ion, is substituted at the type B lattice site to counter the charge imbalance. The Lu is maintained at concentrations from about 0.5 mole fraction to about 0.995 mole fraction. The concentration of AE may vary from about 0.001 to about 0.5, which means that "m" is in a range of about 0.001 mole fraction to about 0.5 mole fraction. In one example, concentration of calcium may be about 0.2 mole fraction, which means that "m" is 0.2. In certain embodiments, strontium concentration may be as high as 0.3 while barium concentration may be about 0.15.

Other representative compositions include $(Lu, RE, Y)_{3-3m} (AE)_{3m} D_m E_{2m} Al_{3-3m} O_9$, where D and E are divalent and pentavalent ions, and where the type A lattice site has one or more of Lu, RE, Y or AE, and type B lattice site may include D and E, to counter the charge imbalance. Example ions at the B site include divalent magnesium (Mg), pentavalent tantalum (Ta), and tetravalent zirconium (Zr), hafnium (Hf), silicon (Si) and germanium (Ge).

In certain embodiments, ions are substituted at the B lattice site. The replacement of aluminum with other ions at the B site, for example magnesium, may lower the temperature required for further processing. Materials suitable for substitution at B sites include ions of elements selected from a group consisting of transition elements, rare earth elements, semi-metals and alkaline earth elements. In particular embodiments, the ions are selected from one or more of magnesium (Mg), zinc (Zn), scandium (Sc), silicon (Si), germanium (Ge), titanium (Ti), zirconium (Zr), hafnium (Hf), niobium (Nb), and tantalum (Ta). In a non-limiting example, aluminum cations at B sites may be replaced by divalent magnesium cation and tetravalent hafnium cation to maintain charge balance. Typical compositions may be represented as (Lu, RE, Y) $Al_{1-m} D_{m/2} C_{m/2} O_3$, where D and C are divalent and tetravalent ions, respectively. Other compositions may be represented as (Lu, RE, Y) $Al_{1-3m/2} D_m E_{m/2} O_3$, where D and E are divalent and pentavalent ions, respectively. Here, Lu, RE and Y stand for one or more of lutetium (Lu), rare earth element (RE), or yttrium (Y) at the type A lattice site. The Lu is maintained at concentrations from about 0.5 mole fraction to about 0.995 mole fraction. The "m" is in a range from about 0.001 mole fraction to about 0.5 mole fraction. The substitution of ions at the A site and B site may stabilize the perovskite structure over a wide range of temperature and may enhance processing at lower temperature, thereby reducing the risk of detrimental grain growth.

The article may be further doped with one or more dopants. The dopant may impart useful optical properties to the article and may find applications in, for example, scintillators, laser assemblies, and detectors. In some embodiments, the dopant comprises a rare earth element. Suitable examples of a rare earth dopant include cerium (Ce), neodymium (Nd), europium (Eu), terbium (Tb), ytterbium (Yb), thulium (Tm), holmium (Ho), and praseodymium (Pr). In certain embodiments, the dopant is a transition metal element including one or more of titanium or chromium.

The concentration of dopants may be adjusted to control the optical properties of the oxide. For example, laser applications may require relatively high concentration of the dopants to achieve the requisite emission properties. In certain embodiments, the dopant concentration is less than about 15 mole percent. In particular embodiments, the concentration is in a range from about 0.005 mole percent to about 15 mole percent. In one embodiment, the concentration of the dopant is in a range from about 0.005 mole percent to about 6 mole percent.

The polycrystalline article has a plurality of crystallites. The mean size of the crystallites may vary from nanometers to micrometers. A high concentration of lutetium at the A site requires high formation temperature and thus may result in bigger crystallite size. However, large crystallites detract from the optical properties, such as the transparency, of polycrystalline articles made using the article. The size of the crystallites depends on factors that may be controlled during formation. In a non-limiting example, the size of the crystallites formed using a fuel assisted solution synthesis, described in more detail below, depends in part on the amount of fuel added during the course of the reaction. In one embodiment, the crystallite size is less than about 10 microns. In another embodiment, the crystallite size is in a range from about 0.1 microns to about 10 microns. In certain embodiments, the crystallite size is in a range from about 10 nanometers to about 0.1 microns.

Material in powdered form, such as the material described above formed by fuel assisted solution synthesis, may be further processed to form a solid ceramic article. In one embodiment, the oxide, formed as a polycrystalline powder having a plurality of crystallites, is sintered to form a transparent ceramic article. The process of sintering is well-known in the art, and various methods for controlling the process and its product are in common use, as will be discussed below. In a non-limiting example, the article is an emission medium for laser assembly. In another example the article is a scintillator.

A laser assembly having an emission medium, where the emission medium includes the oxide as described above, is provided. In one embodiment, the polycrystalline oxide has a perovskite structure. The oxide may form a transparent, dense article which is disposed within an active medium of the laser assembly. The article may further be doped with, for example, neodymium (Nd). Other suitable dopants include other rare earth elements, such as europium (Eu), praseodymium (Pr), holmium (Ho), thulium (Tm), and ytterbium (Yb); and transition metal elements, such as titanium, and chromium. In one embodiment, concentration of doping is less than about 15 mole percent. In another embodiment, concentration of doping is in a range from about 0.005 to about 15 mole percent.

The term "scintillator" is generally understood in the art to refer to a material or an article that emits visible light on exposure to radiation. In many imaging applications, scintillators are usually designed to absorb X-rays and emit visible light. An example scintillator application is Positron Emission Tomography (PET). Other imaging applications utilizing scintillators include an X-ray detector, a gamma ray detector, and a neutron detector.

PET employs a radioactively labeled substance administered to a patient that is subsequently traced by following the decay of the radioactively labeled substance using a suitable photodetector. The radioactive decay results in an emission of radiation. The value of PET as a clinical imaging technique is in large dependent upon the performance of the photodetectors. The photodetector includes scintillator material, which upon exposure to the radiation emits light in the visible region. It is desirable to have scintillator material having good stopping power, high light output, and fast decay time.

As previously discussed, a scintillator material including lutetium is expected to have good stopping power due to the high density of lutetium. In one embodiment, the scintillator includes a host material made of the oxide described previously herein. In one embodiment, the polycrystalline oxide has a perovskite structure. The oxide may be further processed to form a transparent article. The host material including the oxide may further be doped with one or more of europium, praseodymium, cerium, and neodymium. Typically the concentration of dopant is up to about 15 mole percent. In some example, concentration of dopant may vary from about 0.005 mole percent to about 15 mole percent.

In accordance with one embodiment, a method of preparing the oxide using a fuel assisted solution synthesis (FASS) is provided. Precursors of lutetium and aluminum are mixed to form a homogenized precursor solution. In certain embodiments, precursor of materials that may substitute at A lattice site, including rare earth element and yttrium, and materials that may substitute at B lattice site may be included in the precursor solution. In one example, dopant precursors are added in the precursor solution. Example precursors include oxides, nitrates, acetates, and carbonates of the metals. Precursors that are not nitrates are dissolved in an effective amount of nitric acid to convert to nitrate precursors.

The pH of the precursor solution is adjusted by adding nitric acid. In one embodiment, the pH is in a range from about 0.5 to about 5. A relationship holds between the morphology of the crystallites or subsequent particles and the pH of the homogenized precursor solution. For example, a spheroidal morphology is achieved for pH values of less than about 1.0.

The precursor solution is then mixed with a fuel. Suitable examples of fuel include, but are not limited to, glycine, urea, and hydrazine. The ratio of precursors to fuel may be varied to control the size of the crystallites or the subsequent particles. In one example, ratio of precursors to fuel of about 2:1.4 may result in particle sizes in a range from about 0.5 microns to about 1 micron. In another example, the ratio of precursors to fuel of about 2:0.7 may result in particle sizes which is in a range from about 10 nanometers to about 200 nanometers. Generally, a smaller crystallite size is desirable for further processing into transparent articles.

The precursor solution including the fuel self-ignites or decomposes at temperatures of about 300° C. to about 400° C. to form a powder of the material. Optionally, during FASS the particle or grain formation may be achieved by increasing the ratio of fuel to precursors in moles, but disadvantageously it may form bigger particles due to less control of the reaction.

The method further includes processing the powder thus obtained. The powder is homogenized using methods known in the art, such as grinding, milling, and the like. The homogenized powder is subjected to controlled calcinations known to one skilled in the art, leading to phase pure composition with the desired properties, such as size, shape and morphology. In one example, the powder is subjected to various heat treatments or calcinations for a period ranging between an hour to about 12 hours. In one example, the temperature is in a range from about 600° C. to about 1700° C. In a specific example, the temperature is in a range from about 800° C. to about 1200° C.

Following heat treatment, the homogenized powder is sintered, using methods known to one skilled in art. In one example, a hot press is used at a temperature lower than the melting point of the material, to form a transparent ceramic article.

In one example, the polycrystalline powder of the desired composition is sintered in the presence of grain growth additives such as lithium, magnesium, calcium, silicon, or fluorine, to form a sintered ceramic. The sintered ceramic may contain seed crystals from which grain growth may proceed epitaxially at a temperature lower than the melting point of the composition. The sintered ceramic is then hot pressed at a constant pressure of about 100 GigaPascal to form a transparent ceramic article.

Example

Figure 2:
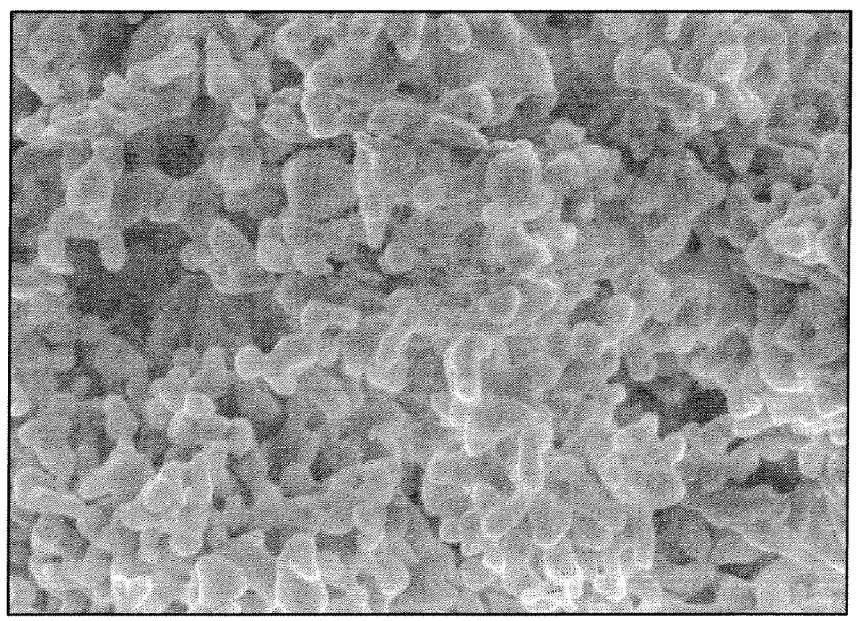
FIG. 2 is a typical SEM image of $Lu_{0.8}Gd_{0.15}Y_{0.05}AlO_3$ having a crystallite size of about 200 nanometers.

A 10 g batch of the composition of lutetium gadolinium yttrium aluminate ($Lu_{0.8}$ $Gd_{0.15}$ $Y_{0.05}$ $AlO_3$) having 80 mole percent lutetium, 5 mole percent yttrium, 15 mole percent gadolinium, was prepared. A precursor solution was prepared by dissolving lutetium oxide (6.56 g), yttrium oxide (0.23 g), gadolinium oxide (1.12 g) and aluminum nitrate (15.46 g) in 20 ml solution of water and nitric acid. The precursor solution was then homogenized by stirring. The pH of the precursor solution was adjusted to 0.5 by addition of water and nitric acid. Final volume of the precursor solution was 100 ml. Glycine (4.39 g) was added to the solution. The solution was placed on a pre-heated hot plate and heated to a temperature of about 300° C. On heating, water was removed and a reaction concentrate was formed. Upon further heating, foaming of the reaction concentrate took place. With continuous heating, the foaming product produced a voluminous, fluffy, gray powder. The powder was then ground to make it homogeneous. The homogenized powder was then placed in an alumina crucible and heated at 1200° C. for 2 hours in air, in a muffle furnace. The powder resulting from the synthesis as well as the heat treated powder was subjected to various characterization techniques such as X-ray diffraction (XRD) and scanning electron microscopy (SEM). FIG. 1 is a typical XRD image of the composition, $Lu_{0.8}$ $Gd_{0.15}$ $Y_{0.05}$ $AlO_3$, prepared using the process described herein. The XRD image indicates that the composition retains a perovskite structure phase. FIG. 2 is a typical SEM image of $Lu_{0.8}$ $Gd_{0.15}$ $Y_{0.05}$ $AlO_3$, prepared using the above method but the amount of glycine was reduced to 2.15 g. The figure shows the crystallites having a mean size of less than about 200 nm. This fine powder may be further processed via sintering under controlled conditions to form a transparent ceramic article.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
   providing at least one metal precursor, wherein the at least one metal precursor is selected from a group consisting of oxides, nitrates, acetates, and carbonates;
   forming a homogenized precursor solution of the at least one metal precursor;
   adjusting the pH of the homogenized precursor solution to a range from about 0.5 to about 5;
   adding a fuel to the homogenized precursor solution, wherein the fuel comprises glycine, urea, and hydrazine;
   removing water from the homogenized precursor solution to leave a reaction concentrate;
   igniting the reaction concentrate to form an oxide powder comprising type A lattice sites and type B lattice sites, the oxide having a formula of $ABO_3$, wherein A represents material occupying the type A lattice sites and B represents material occupying the type B lattice sites, wherein A comprises a plurality of elements, the plurality of elements comprising lutetium, wherein the lutetium is present in an amount of at least about 0.5 mole fraction of the oxide, and wherein B comprises aluminum; and
   sintering the oxide powder in the presence of a grain growth additive to form a sintered ceramic.

2. The method of claim 1 further comprising,
   providing at least one dopant precursor, wherein the at least one dopant precursor is selected from a group consisting of oxides, nitrates, acetates, and carbonates.

3. The method of claim 1, further comprising processing the powder to form a solid transparent ceramic article.

* * * * *